Jan. 4, 1966 V. BAVARO 3,227,508
SOUND PROJECTOR PROVIDED WITH VISION SCREEN AND WORKING
BY MEANS OF INTERCHANGEABLE LOADING APPARATUS
Filed Nov. 20, 1961 5 Sheets-Sheet 1

INVENTOR.
VINCENZA BAVARO

BY

ATTORNEY.

INVENTOR.
VINCENZA BAVARO

BY

ATTORNEY.

INVENTOR.
VINCENZA BAVARO

BY

ATTORNEY.

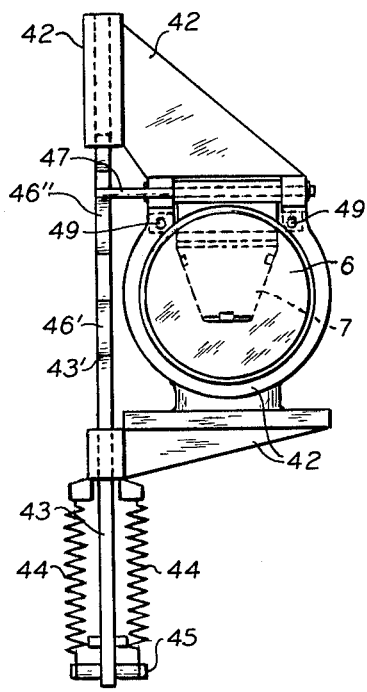
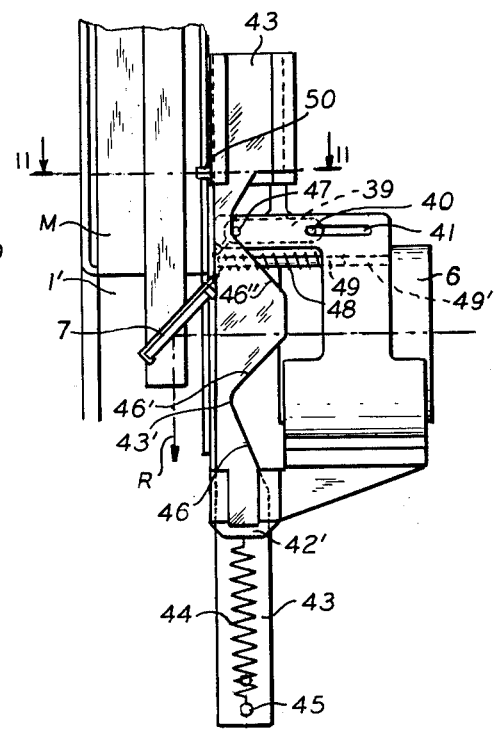
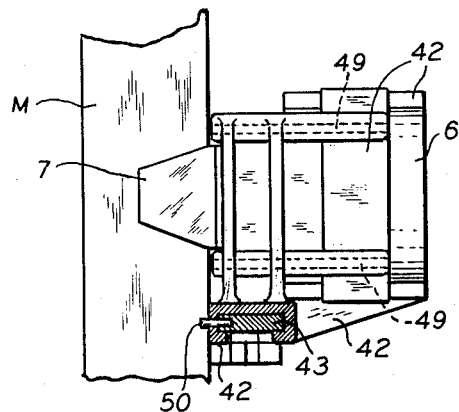

United States Patent Office 3,227,508
Patented Jan. 4, 1966

1

3,227,508
SOUND PROJECTOR PROVIDED WITH VISION SCREEN AND WORKING BY MEANS OF INTERCHANGEABLE LOADING APPARATUS
Vincenza Bavaro, Viale Regina Margherita 2, Milan, Italy
Filed Nov. 20, 1961, Ser. No. 153,297
Claims priority, application Italy, Nov. 22, 1960, 8,337/60; May 25, 1962, Patent 640,312
8 Claims. (Cl. 352—27)

The present invention relates to a sound projector containing a vision screen disposed in the front portion of the apparatus, and working by means of film holders for inserting the film contained within the projector, the film holders being interchangeable, and each film being unwound from a film holding spool, and simultaneously rewound onto a corresponding similar holding spool.

It is one object of the present invention to provide a sound projector which comprises a closed cycle of operation, whereby the movements are obtained by means of driving means also disposed within the projector, and capable of cooperating with the means of the holding device for controlling the film, when the holding device is completely inserted and locked in working position. In the projector are also provided, in addition to a source of lighting and a combined optical system, an electric motor for operating the driving means, a feeding transformer inserted in the lighting system circuit, and a mirror bearing means provided in turn with a linear double cam tending to displace during the phases of feeding and displacement of the film holder loading device one of the reflecting mirrors of the optical system, in order to put it again into the right position of operation, in the same manner as the aforesaid loading device has been inserted into the projector, while guiding members for the film control the unwinding and simultaneous rewinding movement of the film, so that the holder may be ready for a successive projection at any time.

Figure 1:
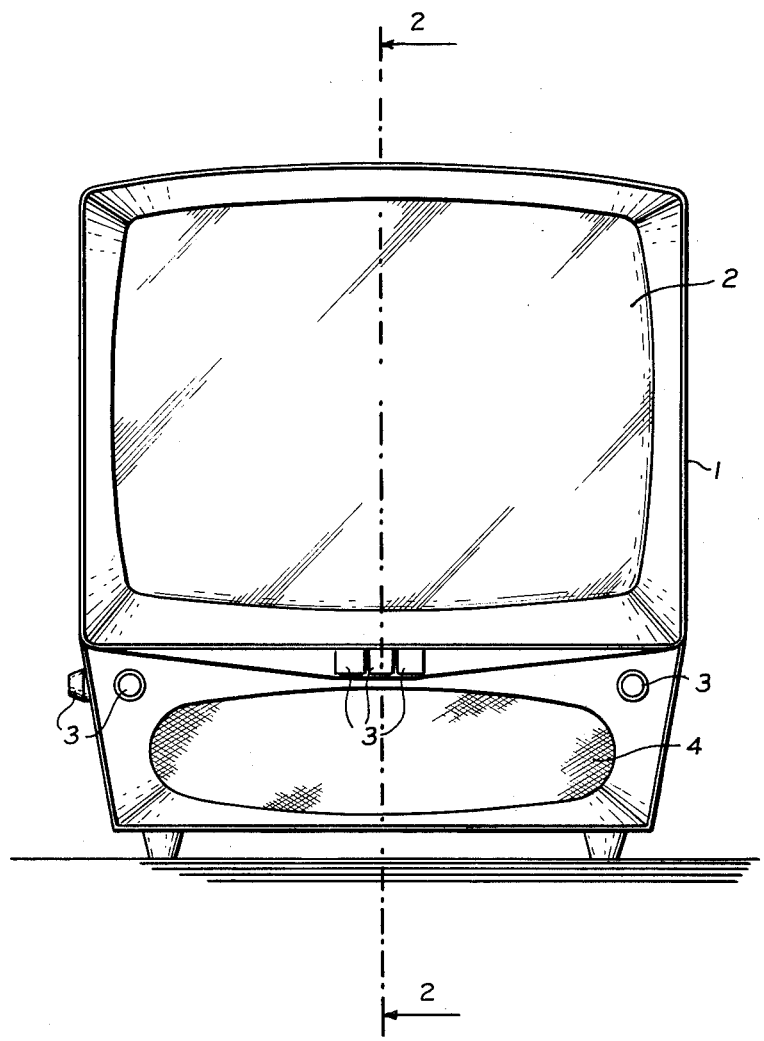
Figure 2:
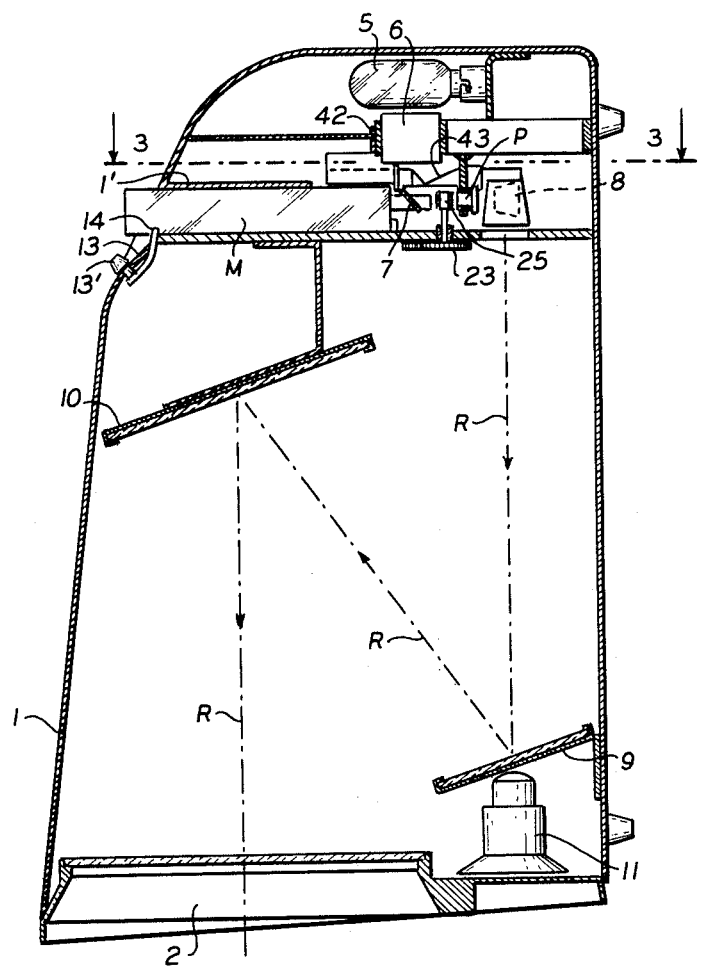
Figure 3:
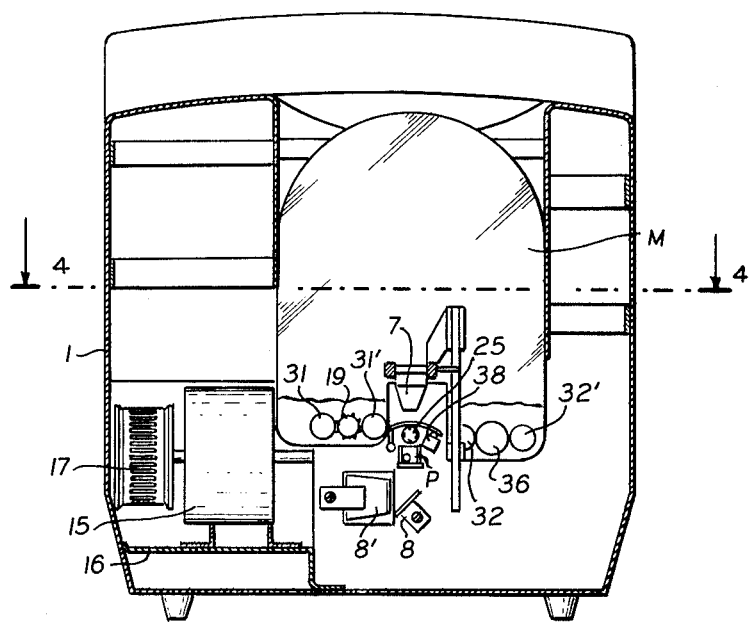
Figure 4:
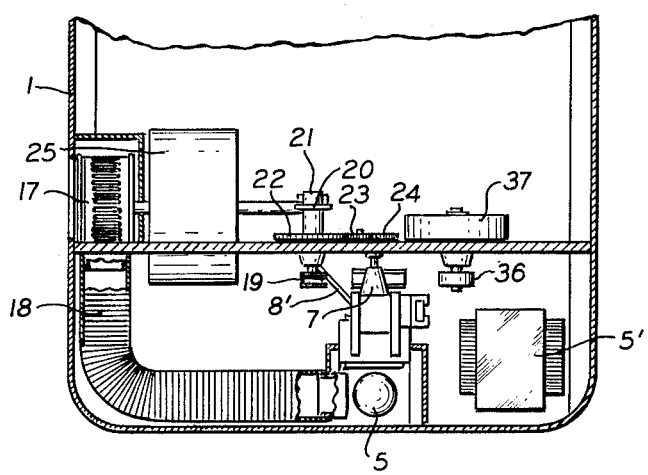
Figure 5:
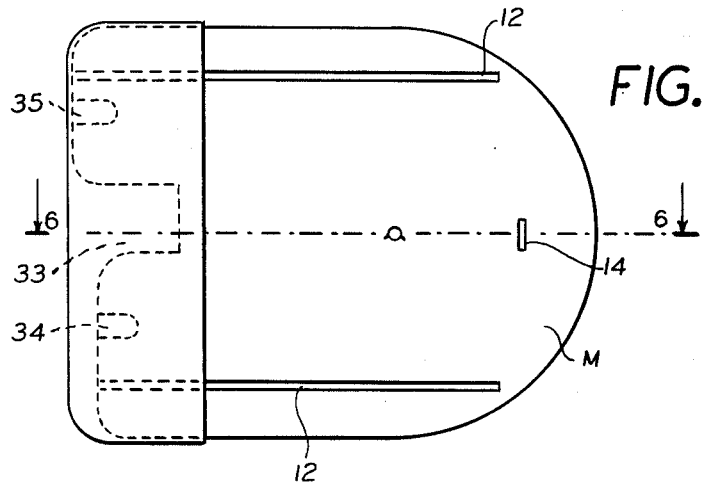
Figure 6:
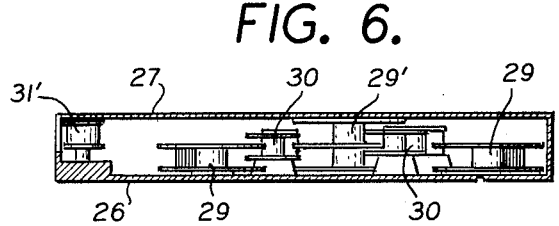
Figure 7:
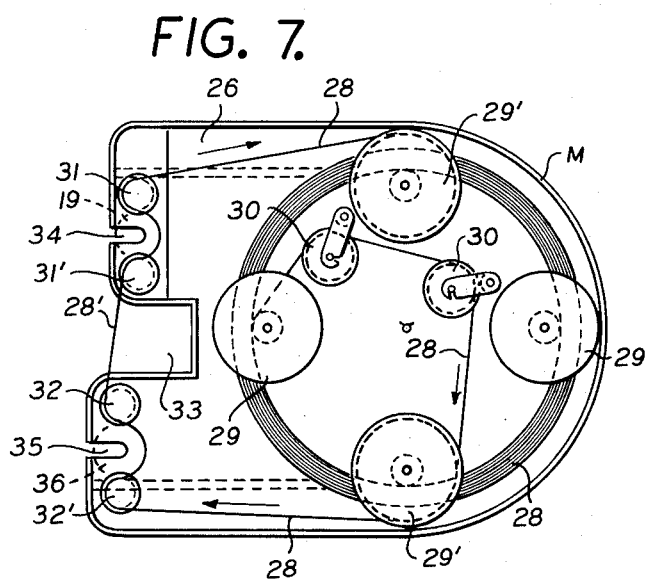
Figure 8:
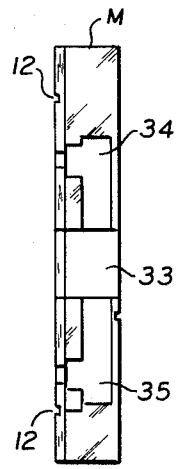

With this and other objects in view, which will become apparent in the following detailed description, the present invention will be clearly understood in connection with the accompanying drawings, in which:

FIGURE 1 is a front elevation of a projector, designed according to the present invention;

FIG. 2 is a section along the lines 2—2 of FIG. 1;
FIG. 3 is a section along the lines 3—3 of FIG. 2;
FIG. 4 is a section along the lines 4—4 of FIG. 3;
FIG. 5 is a front elevation of a loading device;
FIG. 6 is a section along the lines 6—6 of FIG. 5;
FIG. 7 is a rear elevation of the loading device, the closing cover being omitted;
FIG. 8 is an end view of the device shown in FIG. 7;
FIG. 9 is a fragmentary view of the device for displacing the mirror holder, shown in the same position as in FIG. 2;
FIG. 10 is a fragmentary view of the device shown in FIG. 9 set off for 90° in a vertical plane; and
FIG. 11 is a top plan view of the mirror bearing device, partly in section, along the lines II—II of FIG. 9.

Referring now to the drawings, and in particular to FIGS. 1–3, the apparatus comprises a housing 1, in the front portion of which is disclosed a vision screen 2, and a plurality of knobs 3 for controlling the apparatus, as well as a small window 4 having a screen, and an opening for audio, the opening being protected by means of a piece of fabric.

A lighting bulb 5 is disposed inside of the housing 1, which bulb is fed with electric current from a transformer 5' (FIG. 4) connected with an optical condenser 6, so that the light rays R may be directed toward the screen, after they pass the film, due to the cooperation of reflecting mirrors, 7, 8, 8', 9 and 10, properly disposed within

2 the projector, in combination with a loudspeaker 11 for the emission of the sound reproduction.

The housing 1 has at its upper portion a recess 1' receiving a film holder loading device M which is guided in its operative position by means of guiding grooves 12 (FIG. 5), and a preferably resilient nose portion 13 (FIG. 2) received by an engaging slot 14 disposed at the front face of the film holder loading device M, which can thus be disengaged and replaced by another device, by simply lifting the nose 13 by rotating a controlling knob 13'.

An electric motor 15 placed on a platform 16 of the projector actuates a fan 17 for cooling the lighting bulb 5 by means of air supplied through a tube 18.

The electric motor 15 drives also a toothed roller 19 for moving the film by means of a gear 20, which is connected with a rotating shaft 21 carrying the gear 20, which by means of three pulleys 22, 23 and 24 rotates a prism 25 disposed in the optical axis in order to register the images.

The film holder loading device M comprises a receiving casing 26 having a cover 27, and which is displaceable for the changing of the film, and includes inside thereof, as shown in FIGS. 5–8, a camera film 28 wound in spiral arrangement, and fed by a plurality of spools 29, of which at least two spools 29' are provided with a double flange for the purpose of permitting the unwinding of the film from the inside of the spiral winding, and its rewinding to the outside without interruption, by means of reversing rollers 30 suitably disposed, and returned elastically in order to stretch the film constantly during its travel for the reproduction.

Beneath the film holder loading device M, there are disposed two pairs of rollers 31, 31' and 32, 32', which rollers idle and serve the purpose of stretching the film in front of a chamber 33, in which the first mirror collects the light rays R for their reflection, so as to direct them towards the objective P, wherein the rays pass through the film for projecting the images onto the vision screen (FIG. 2).

Adjacent the chamber 33, which contains the reflecting mirror 7, the loading device is provided at its lower portion with two further recesses 34 and 35, wherein a toothed roller 36 (FIG. 4) of a flywheel 37 is disposed for controlling the speed, and which is supported for idling inside of the projector.

Upon inserting a film holder loading device M through the chamber 1' provided in the apparatus, until the same abuts against the nose 13 within the slot 14, as already stated above, the toothed roller 19 and the toother roller 36, operatively connected with the flywheel, are, respectively, disposed in the recesses 34 and 35, thus drawing the loading device M inside for the corresponding portion of the film 28, which due to its overlapping on the upper side of the rollers 19 and 36, wherein it remains overlapped on the lower portion of the reversing rollers 31, 31' and 32, 32', will be operated by the toothed roller 19, thus also operating at the same time the roller 36, and the flywheel 37, while a magnetic head 38 (FIG. 3), which is operatively connected with the loudspeaker 11, brings about the sound reproduction.

In order to avoid that during the insertion of the loading device M into the projector, the lower portion 28' of the film 28 engages the mirror 7, which is adapted to be located in the chamber 33, in order to assume its operating position, the same is secured to a slide 39 or any similar movable member, f.i. by means of a horizontally sliding pivot 40 which acts within a slot 41 provided in the fixed portion 42 for supporting the optical condenser 6.

The movement of the slide 39 for supporting the mirror holder is obtained by means of a linear cam, which may be replaced by a vertical rod 43, the cross section of which is rectangular, and is constantly urged upwardly by one or a plurality of springs 44 which are secured to the lower portion of the rod 43 and provided with a pivot 45, and at the upper portion of the rod 43 is provided the fixed portion 42, which supports the condenser 6 by a collar 42' (FIG. 9).

The linear cam 43 has on its side a member 46' in the shape of a double V against which a part 47, rigid with the mirror holder slide 39, is constantly pressed by one or more springs 48 which are located about the guiding shafts 49 which project from the slide, and are movable within coaxial slots 49' which are provided in the fixed portion 42 of the condenser holder.

During the insertion of a loading device M into the projector one or more projections 50 (FIG. 11) of the linear cam 43 retain the latter at a downward position against the action of the springs 44, which projections 50 abut a corresponding projection provided in the guiding slots 12, thereby determining the displacement of the pivot 47. By this arrangement the slide 39 is permitted to move to the right (as indicated in FIG. 9) and its return to the left (in the drawing), whereby the mirror holder is also returned, since the pivot 47 is at first retained to be raised along the incline 46' (FIGS. 9 and 10) and to be lowered along the incline 46'' of the cam 43 in order to move the mirror into its operative position.

During removal of the loading device M from the projector, which operation causes the automatic lifting of the cam 43 due to the action of the springs 44, the horizontal displacement of the slide 39 with and without the mirror, will take place in the same manner, yet starting now from the incline 46'' to the position in which the pivot 47 of the slide 39 is finally placed in the groove 43' of the cam 43, so that the mirror 7 assumes the resting position, in the manner illustrated in FIGS. 2 and 9, the cam 43 being totally raised and ready to be moved downwardly for the insertion of another loading device.

While I have disclosed one embodiment of the present invention, it is to be understod that this embodiment is given by example only and not in a limiting sense, the scope of the present invention being determined by the objects and the claims.

I claim:
1. A projector comprising
   a housing,
   a screen disposed in the front of said housing,
   a film holder loading device interchangeably received in said housing and receiving a film,
   said film holder device having a light passage,
   means for unwinding and simultaneously rewinding said film,
   means for moving said film in said film holder loading device,
   a source of lighting disposed in said housing,
   an optical system operatively connected with said source of lighting,
   a magnetic head and a loudspeaker synchronized with the movement of said film,
   a plurality of mirrors directing the path of rays from said source of lighting toward said screen,
   means operated by said film holder device for displacing at least one mirror holder during insertion and removal, respectively, of said film holder loading device into and from said housing, so that said light passage is aligned with said optical system in the operative position,
   means for guiding and passing said film past light rays originating from said light source and emerging from said optical system.

2. The projector, as set forth in claim 1, wherein said optical system comprises
   an objective,
   an optical condenser, and
   said mirrors being disposed angularly relative to each other to guide light rays from said objective toward said screen.
3. The projector, as set forth in claim 1, wherein
   said housing defines a recess receiving said film holder loading device therein,
   said film holder loading device including a casing having longitudinal guiding grooves and a slot intermediate its ends, and
   said housing has a nose member received in said slot in the operative position of said casing.
4. The projector, as set forth in claim 1, wherein
   said film holder loading device comprises means for spirally winding a film therein,
   said winding means include supporting rollers,
   at least two of said supporting rollers have a double flange for unwinding and rewinding of said film, and
   guiding and reversing rollers for said film located to assist in unwinding and rewinding of said film and for bridging said film for exposure to light rays emerging from said optical system.
5. The projector, as set forth in claim 1, wherein
   said film moving loading device comprises a toothed roller, and
   an electric motor turning said toothed roller,
   the latter being adapted to engage perforations of said film.
6. The projector, as set forth in claim 5, which includes a flywheel operatively connected with said electric motor in order to control the speed of said toothed roller.
7. The projector, as set forth in claim 1, which includes a slide operatively connected with said film holder loading device,
   said slide including means for supporting said mirror holder,
   a cam and spring biasing means for engagement of said slide with said cam, and
   the latter controlling the insertion of said film holder loading device into said housing.
8. The projector, as set forth in claim 7, which includes spring means urging said cam into a resting position, and
   said cam comprises a rod having successively two V-shaped edge formations in engagement with said slide, so that the latter is displaced upon longitudinal movement of said cam simultaneously with the insertion and removal, respectively, of said film holder loading device into said housing.

References Cited by the Examiner

UNITED STATES PATENTS

| | | | |
|---|---|---|---|
| 1,275,189 | 8/1918 | Rutzen | 352—36 |
| 2,214,468 | 9/1940 | Lannerd | 352—8 |
| 2,238,719 | 4/1941 | De Tartas | 242—55.19 X |
| 2,256,337 | 9/1941 | Boor | 352—34 |
| 2,268,734 | 9/1951 | Heyer | 215—95 |
| 2,676,766 | 4/1954 | Ross et al. | |
| 2,782,680 | 2/1957 | Howell | 88—28 X |
| 3,025,750 | 3/1962 | Polan | 352—10 |
| 3,139,789 | 7/1964 | Schrader | 352—72 |

NORTON ANSHER, *Primary Examiner.*

G. Y. CUSTER, *Examiner.*